W. F. CLARK.
FURNACE CHARGING APPARATUS.
APPLICATION FILED OCT. 16, 1913.
1,153,605.
Patented Sept. 14, 1915.
2 SHEETS—SHEET 1.
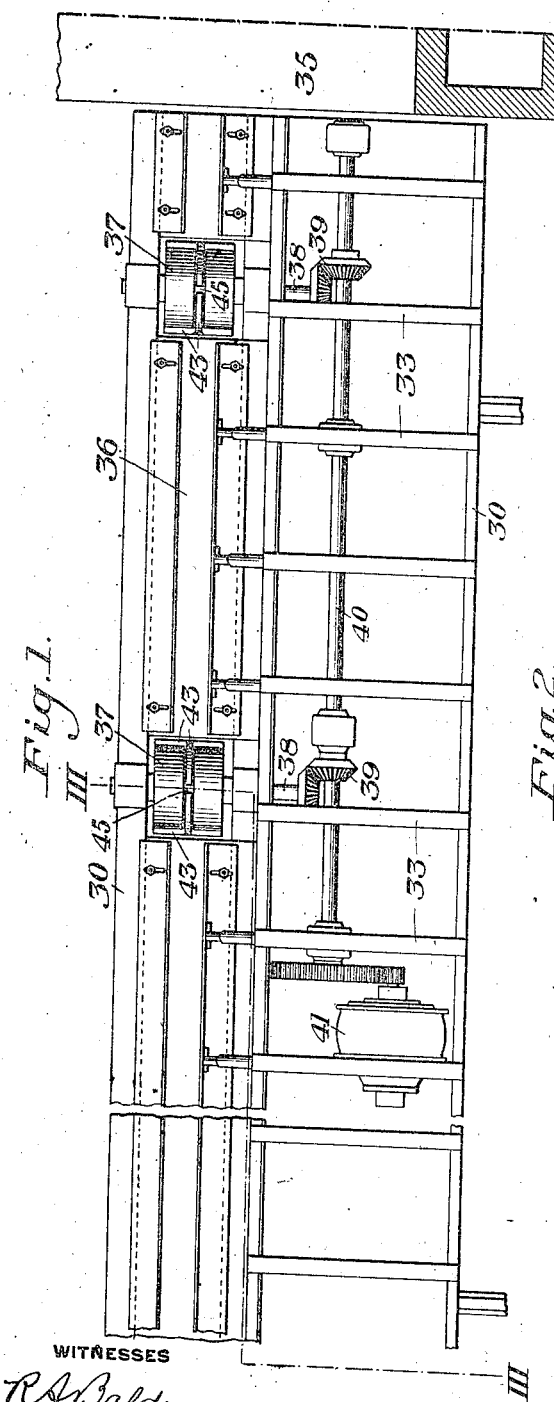
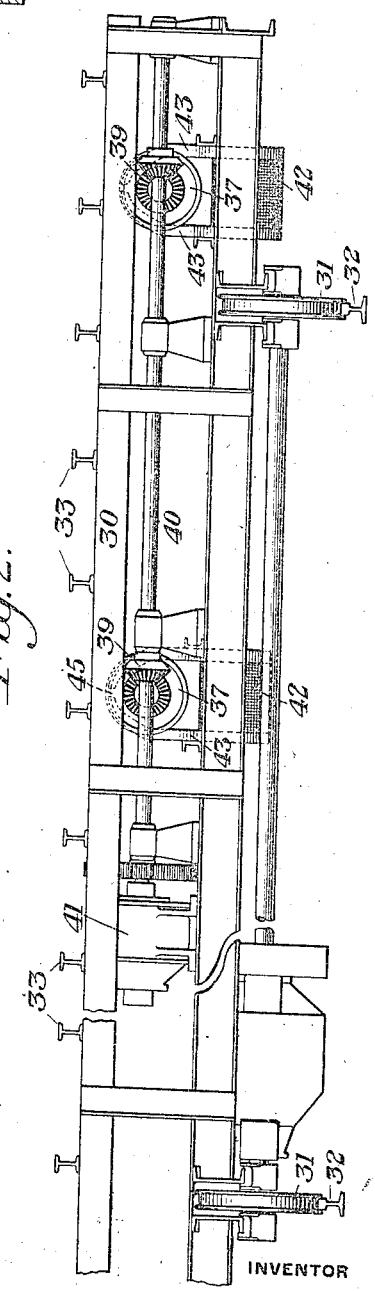

W. F. CLARK.
FURNACE CHARGING APPARATUS.
APPLICATION FILED OCT. 16, 1913.

1,153,605.

Patented Sept. 14, 1915.
2 SHEETS—SHEET 2.

WITNESSES

INVENTOR

UNITED STATES PATENT OFFICE.

WILLIAM F. CLARK, OF CORAOPOLIS, PENNSYLVANIA.

FURNACE-CHARGING APPARATUS.

1,153,605.

Specification of Letters Patent. Patented Sept. 14, 1915.

Application filed October 16, 1913. Serial No. 795,461.

*To all whom it may concern:*

Be it known that I, WILLIAM F. CLARK, a citizen of the United States, residing at Coraopolis, in the county of Allegheny and State of Pennsylvania, have invented a new and useful Improvement in Furnace-Charging Apparatus, of which the following is a full, clear, and exact description, reference being had to the accompanying drawings, forming part of this specification, in which—

Figure 3:
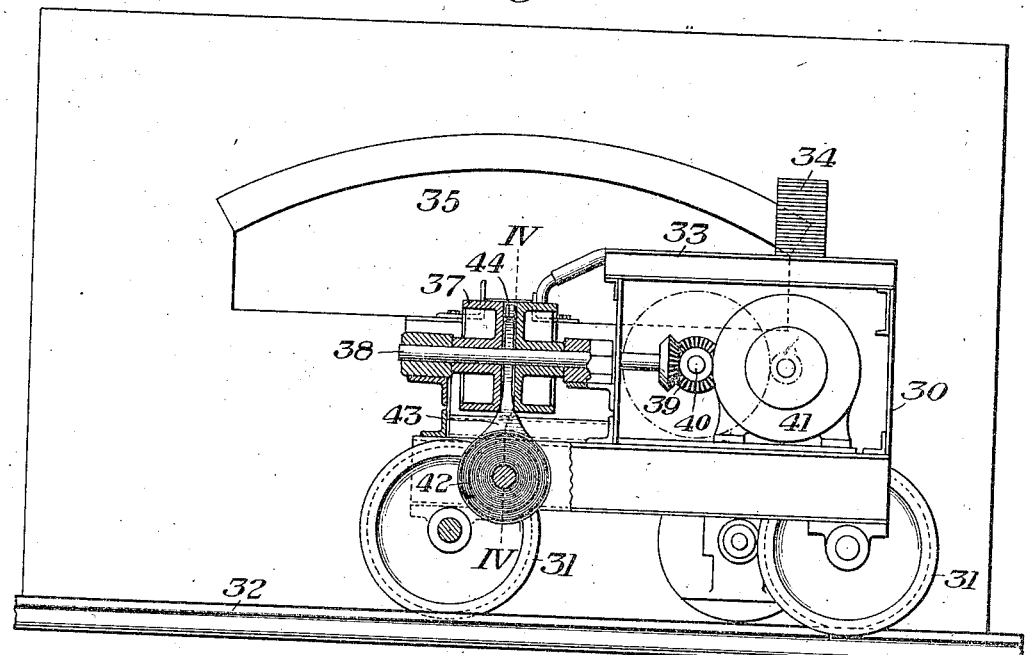
Figure 4:
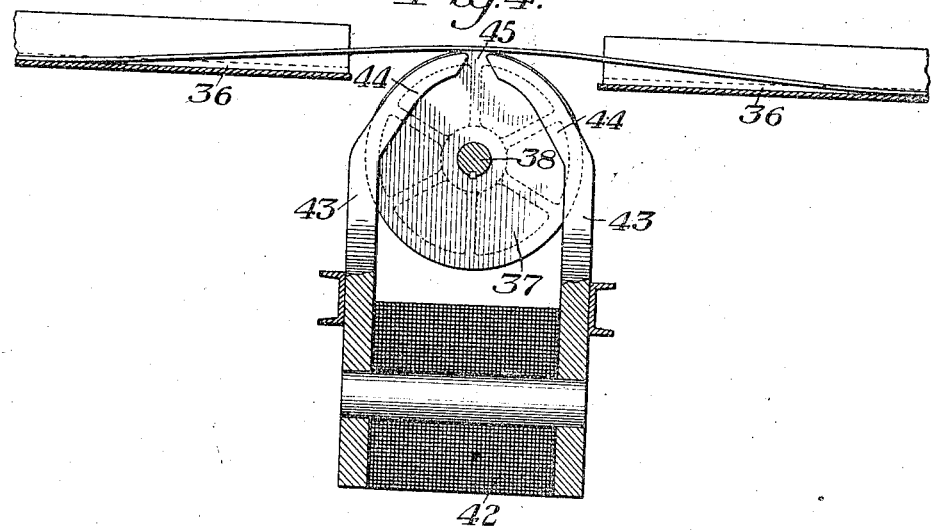

Figure 1 is a plan view of a machine embodying my invention; Fig. 2 is a side elevation of the same; Fig. 3 is a section on the line III—III of Fig. 1; and Fig. 4 is a section on the line IV—IV of Fig. 3.

My invention has relation to certain new and useful improvements in furnace-charging apparatus, and more particularly, to apparatus for charging skelp into heating furnaces.

The present invention is an improvement upon the apparatus described and claimed in my Patent No. 1,071,879, dated September 2, 1913.

The object of the invention is to provide an improved construction and arrangement of the feed rollers and also of the magnets which are employed to give necessary traction between these rollers and the skelp. The present invention provides a very simple and efficient arrangement of these parts, as will hereinafter more fully appear.

Referring to the accompanying drawings, in which I have shown the preferred embodiment of my invention and which will now be described, the numeral 30 designates the framework of the charging bench, which is supported on wheels 31, engaging the tracks 32.

33 designates a table or support mounted on said frame and on which the skelp 34 to be charged into the furnace 35 is stacked.

36 is a suitable trough or guide for the skelp.

37 designates feed rolls which are journaled in the frame 30 transversely thereof. These rolls are arranged in pairs, the two rolls of each pair being placed side by side and separated from each other laterally, at least, at their peripheral portions, by a distance less than the width of the skelp or other pieces to be charged into the furnace. The rolls of each pair are rigidly secured to a transverse shaft 38, which is driven by suitable gear connections 39 with a longitudinal shaft 40. The shaft 40 may be driven by any suitable means, such as the electric motor 41, mounted on the frame 30. The rolls are preferably so placed that their peripheral portions will extend slightly above the bottom of the trough 36, as best shown in Fig. 4.

Below each pair of rolls is an electromagnet 42, having pole pieces 43, extending upwardly into the space separating the two rolls. The upper end portions of these pole pieces are curved inwardly from opposite sides, as indicated at 44, their adjacent ends being separated by an air gap at 45. The outer surfaces of the portions 44 of the pole pieces are curved to conform approximately to the circumference of the rollers 37, but are slightly below the peripheral surface of such rolls, so that the skelp will at all times be held by the rollers out of contact with the pole pieces.

I prefer to make the rollers of non-magnetic material, although good results may be obtained by properly spaced rollers of magnetic material, so that the magnetic circuit passes from one pole piece to the other longitudinally through the skelp. In this manner I obtain a very powerful tractive force for holding the skelp against the feed rollers, whereby the skelp in passing over these rollers receives sufficient momentum to charge it into the furnace.

It will be noted that by constructing and arranging the magnets in the manner shown, they may be removed sufficiently far away from the furnace so as not to be affected by the heat thereof, and if necessary, they can be efficiently protected from such heat when placed close to the furnace, without in any way interfering with the operation of the apparatus. The magnets can also be made of any size necessary to give the required tractive force, irrespective of the size of the rolls. Inasmuch as the magnets are stationary, it is not necessary to provide circuit connections between moving parts for energizing the magnet windings. The arrangement of the magnetic pole pieces relatively to the rollers is also such that the magnets are effective so long as any portion of the skelp is on the rolls.

For charging large sizes of skelp, it is desirable to employ two sets of rollers 37, as shown in Fig. 1. For smaller and lighter skelp, however, one set of these rollers may be omitted and a single pair, properly located, may be employed instead.

Various other changes may be made in the details of construction and arrangement of parts, without departing from the spirit and scope of my invention as defined in the appended claims.

I claim:

1. A furnace charging apparatus, comprising a pair of feed rollers of nonmagnetic material, said feed rollers being close to each other and arranged to rotate about a common axis, and a magnet having narrow pole pieces on opposite sides of the axis of the rollers and between the rollers; substantially as described.

2. A furnace charging apparatus, comprising a pair of feed rollers of nonmagnetic material, an axle to which said rollers are secured, there being a narrow space between said rollers, means for rotating said axle, and a magnet having narrow pole pieces on opposite sides of the axle and between the rollers; substantially as described.

3. A furnace charging apparatus, comprising a carriage adapted to be moved transversely in front of the furnace, a table on said carriage for supporting the blanks to be charged into the furnace, a longitudinal trough, a pair of rollers of nonmagnetic material below the trough and extending into the lower portion thereof, said feed rollers being close to each other and arranged to rotate about a common axis, and a magnet having narrow pole pieces on opposite sides of the axis and between the rollers for drawing the pieces to be charged into contact with the periphery of both rollers; substantially as described.

4. A furnace charging apparatus, comprising a carriage arranged to be moved transversely in front of a furnace to be charged, a table on said carriage for the blanks to be charged into the furnace, there being a longitudinal trough on the carriage for receiving the blank from the table, a pair of feed rollers below the trough and extending into the lower portion thereof, a shaft to which said rollers are secured, there being a narrow space between said rollers, means on the carriage for rotating the shaft, and a magnet having narrow pole pieces on the opposite sides of the axis and between the rollers.

5. A furnace charging apparatus, comprising a carriage arranged to be moved transversely in front of a furnace to be charged, a table on said carriage for the blanks to be charged into the furnace, there being a longitudinal trough on the carriage for receiving the blank from the table, a pair of feed rollers below the trough and extending into the lower portion thereof, a shaft to which said rollers are secured, there being a narrow space between said rollers, means on the carriage for rotating the shaft, and an electromagnet supported on the carriage below the rollers having narrow pole pieces extending upwardly between the rollers on opposite sides of the shaft; substantially as described.

6. A furnace charging apparatus, comprising a pair of feed rollers of nonmagnetic material, said feed rollers being close to each other and arranged to rotate about a common axis, and a magnet below said rollers having narrow pole pieces which extend upwardly and inwardly toward each other about the axis and between the rollers; substantially as described.

In testimony whereof, I have hereunto set my hand.

WILLIAM F. CLARK.

Witnesses:
  JESSE B. HELLER,
  H. M. CORWIN.